(12) United States Patent
Childs et al.

(10) Patent No.: US 9,317,505 B2
(45) Date of Patent: Apr. 19, 2016

(54) DISCOVERY, PREVIEW AND CONTROL OF MEDIA ON A REMOTE DEVICE

(71) Applicant: Lenovo (Singapore) Pte. Ltd., Singpaore (SG)

(72) Inventors: Philip Lee Childs, Durham, NC (US); Michael Terrell Vanover, Raleigh, NC (US); Hui Wang, Beijing (CN); Shaowei Chen, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/690,110

(22) Filed: Nov. 30, 2012

(65) Prior Publication Data

US 2014/0156694 A1    Jun. 5, 2014

(51) Int. Cl.
*G06F 17/30*    (2006.01)

(52) U.S. Cl.
CPC .................. *G06F 17/3005* (2013.01)

(58) Field of Classification Search
USPC ................................................. 707/705, 769
See application file for complete search history.

(56) References Cited

U.S. PATENT DOCUMENTS

| | | | | |
|---|---|---|---|---|
| 8,032,508 B2* | 10/2011 | Martinez | ........... | G06F 17/30867 707/602 |
| 2008/0155627 A1* | 6/2008 | O'Connor | .............. | H04N 7/173 725/109 |
| 2010/0095332 A1* | 4/2010 | Gran | ................. | G06F 17/30038 725/93 |
| 2010/0125563 A1* | 5/2010 | Nair | ........................ | G06Q 30/02 707/709 |
| 2010/0125569 A1* | 5/2010 | Nair | .................. | G06F 17/30864 707/722 |
| 2010/0125604 A1* | 5/2010 | Martinez | ........... | G06F 17/30867 707/784 |
| 2010/0125605 A1* | 5/2010 | Nair | .................. | G06F 17/30867 707/784 |
| 2010/0235739 A1* | 9/2010 | Rathi | ..................... | G06F 1/1632 715/716 |
| 2011/0167462 A1* | 7/2011 | O'Connor | .............. | H04N 7/173 725/110 |

* cited by examiner

*Primary Examiner* — Kim Nguyen
(74) *Attorney, Agent, or Firm* — Ference & Associates LLC

(57) ABSTRACT

An aspect provides a method, including: sending a media query from a controller user device to a second user device; receiving media meta data at the controller user device in response to the media query of the second user device, the received media meta data comprising media meta data regarding a media file currently playing on the second user device and media meta data regarding one or more queued media files; providing at the controller user device a visual display based on the received media meta data, the visual display comprising a visual indication of the media file currently playing on the second user device and a preview of the one or more queued media files to be played on the second user device; and issuing one or more control action commands from the controller user device to the second user device. Other aspects are described and claimed.

20 Claims, 3 Drawing Sheets

DISCOVERY, PREVIEW AND CONTROL OF MEDIA ON A REMOTE DEVICE

BACKGROUND

Information handling devices ("devices"), for example cell phones, smart phones, tablet devices, laptop and desktop computers, televisions or flat panel display devices with built in processing and logic circuitry, etc., may be used to view or otherwise consume media data, for example video files and audio files. Managing and controlling the various user devices that may be employed in a use experience is challenging due to the growing ability of user devices to communicate with one another and to cooperate in data handling tasks.

Media data consumption is a common use context where remote control of one or more user devices may be desirable. Conventionally, remote control devices have been limited to simple arrangements for direct communication (e.g., television remote controls and the like), a prearranged pairing of two user devices according to a short range protocol (e.g., via a short range wireless protocol such as BLUETOOTH wireless technology), or a prearranged pairing of two user devices with intermediate, back end devices handling various tasks such as data streaming (e.g., network servers streaming video content to a set top box as controlled by a laptop or tablet computer or other controller device). However, given the rich diversity in media data types, the plurality of media files that may be queued for consumption, and the potential presence of many user controller devices, such conventional control arrangements fall short of offering users needed control over the various user devices that may be employed in a media consumption use context.

BRIEF SUMMARY

In summary, one aspect provides a method, comprising: sending a media query from a controller user device to a second user device; receiving media meta data at the controller user device in response to the media query of the second user device, the received media meta data comprising media meta data regarding a media file currently playing on the second user device and media meta data regarding one or more queued media files to be played on the second user device; providing at the controller user device a visual display based on the received media meta data, the visual display comprising a visual indication of the media file currently playing on the second user device and a preview of the one or more queued media files to be played on the second user device; and issuing one or more control action commands from the controller user device to the second user device.

Another aspect provides an information handling device, comprising: one or more processors; and a memory operatively coupled to with the one or more processors that stores instructions executable by the one or more processors to perform acts comprising: sending a media query from the information handling device to a second user device; receiving media meta data at the information handling device in response to the media query of the second user device, the received media meta data comprising media meta data regarding a media file currently playing on the second user device and media meta data regarding one or more queued media files to be played on the second user device; providing a visual display based on the received media meta data, the visual display comprising a visual indication of the media file currently playing on the second user device and a preview of the one or more queued media files to be played on the second user device; and issuing one or more control action commands to the second user device.

A further aspect provides a program product, comprising: a storage medium having computer program code embodied therewith, the computer program code comprising: computer program code configured to send a media query from a controller user device to a second user device; computer program code configured to receive media meta data at the controller user device in response to the media query of the second user device, the received media meta data comprising media meta data regarding a media file currently playing on the second user device and media meta data regarding one or more queued media files to be played on the second user device; computer program code configured to provide at the controller user device a visual display based on the received media meta data, the visual display comprising a visual indication of the media file currently playing on the second user device and a preview of the one or more queued media files to be played on the second user device; and computer program code configured to issue one or more control action commands from the controller user device to the second user device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
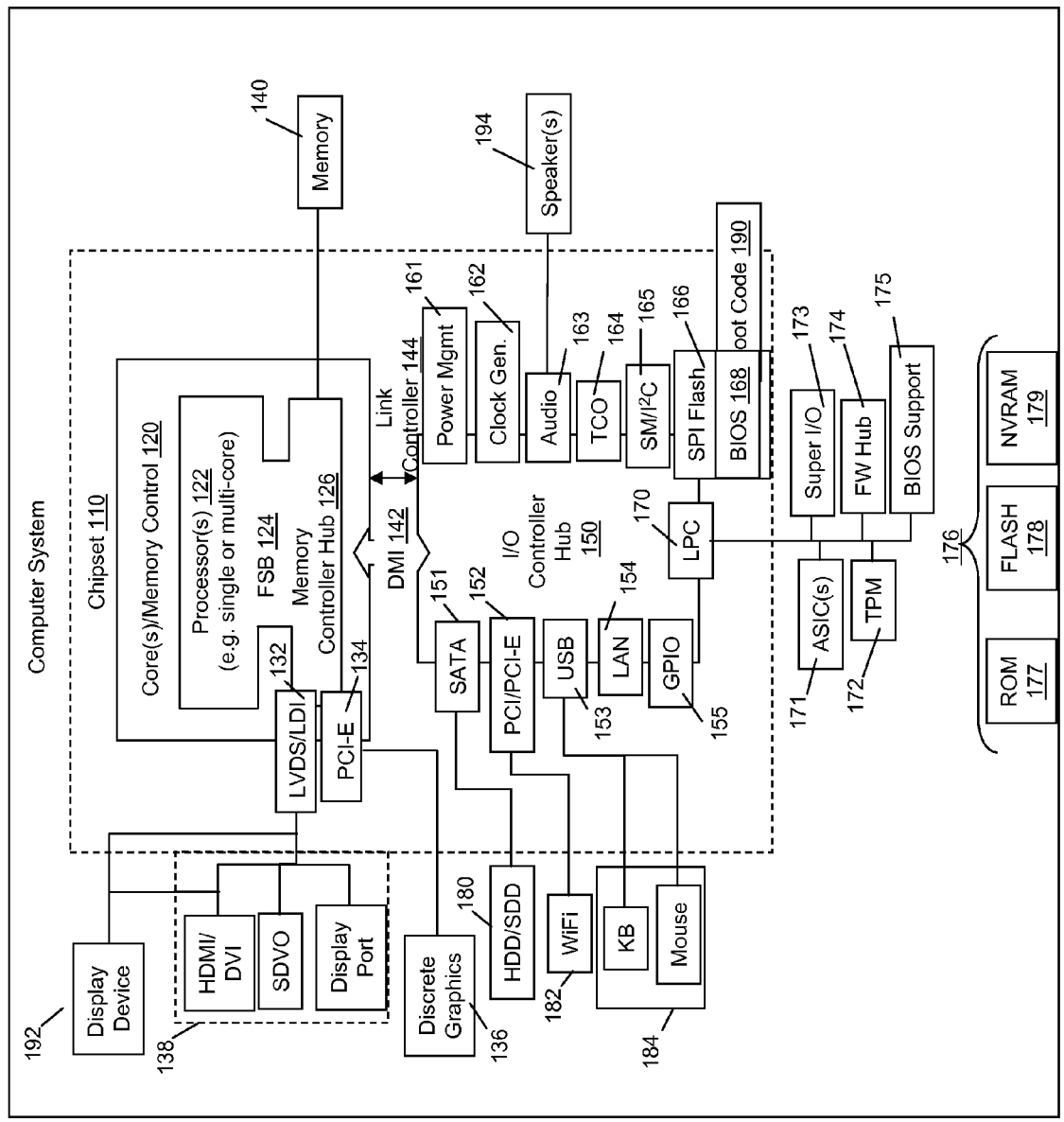
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, remote control devices have been limited in their ability to manage remote devices. For example, some conventional remote control devices are simple arrangements for direct communication with another device, a prearranged pairing of two user devices according to a short range communication protocol, or a prearranged pairing of two user devices with intermediate, back end device(s) handling various tasks such as data streaming. However, given the rich diversity in media data types, the plurality of media files that may be queued for consumption, a need to alter the media file queue, and/or the potential presence of many user controller devices, such conventional control arrangements fall short of offering users needed control over the various user devices that may be employed in a media consumption use context.

For example, while simple conventional remote controls such as television remote controls offer direct control of a dedicated device such as a television set top box and/or television; these controls lack the flexibility to operate other user devices (e.g., personal computing devices such as desktops, laptops, tablets, smart phones and the like). Moreover, these simple remote controls do not offer a visual display, nor do they offer a preview of any kind for media files in a play queue or list. Furthermore, such one-to-one pairing of devices (control and target/destination) precludes use of other user devices as controllers.

While pairing of two user devices over a short range network or via a wide area network offers some advantages to simple conventional remote controls, drawbacks still exist. For example, while a first user device (controller) may be used to operate a second user device (target), such solutions are generally limited to controlling media file playback and associated attributes (e.g., volume) on the first user device (controller), and streaming that media to another device (e.g., a wirelessly connected speaker or television set) for enhanced consumption (e.g., increased audio quality or larger display device). Thus, the "controller" does not control media files being played on another device so much as it simply controls the media file locally and permits the output to be directed to another connected device. Thus, any preview of queued media files are derived solely from the controller device, not the controlled (or other) devices. Moreover, controlling a destination device (e.g., television) with more than one controller user device is not feasible in such a context, as the control and destination devices are paired one-to-one.

In the case of a first user device, such as a personal computing device, e.g., a desktop or laptop computer, tablet or smart phone, etc., acting as a controller of a networked server (or similar back end device), such arrangements are commonly limited to playing the media file (e.g., audio or video file) resident on the server device for output back to the controller device for consumption/display. In some cases, the controller device may be connected to yet another device (e.g., laptop connected to a television for display of a video file streamed from a server); however, the original controller device remains a pass through device for the media. Moreover, even in an arrangement where a user controller device (e.g., laptop or tablet computer) operates a non-user device (e.g., networked server or similar back end device) to play a media file output directly to another device, such as a television, the user control device is limited to handling the individual media file (e.g., video or audio file) currently being played in a piecemeal fashion. Here again, such arrangements generally do not offer any preview of queued media files and limit media file controlling to a single media file at a time, as the user control device, network server (or like back-end device) and the destination device are configured to handle single media files. Even where an entire play list may be created, communicated to a server, and sent to another device, as with other conventional arrangements controller arrangements, conventionally using intermediate devices to facilitate media file streaming and play back precludes the use of more than one user device at a time as a controller device to affect control over media file playback. Thus, although many controller arrangements exist, as in some of the examples described herein, each tends to limit the media consumption user experience in some way.

Accordingly, an embodiment provides mechanisms to allow a first user device (controller device) to obtain meta data regarding media files currently playing and/or to be played by/on (i.e., queued at) a second user device (target or destination device) via querying the second user device. In response to receiving the meta data regarding the media files currently playing and/or to be played by the second user device, the first user device is apprised of not only a currently playing or queued media file of the second device, but also apprised of all the queued media files to be played, irrespective of their origin or derivation (e.g., from another/third user device). An embodiment may therefore provide for preview and control of media file consumption on the second device in a coordinated fashion, even in the presence of other user devices acting as controllers.

As further described herein, such an approach allows the user controller device to preview and participate in controlling the second user device with respect to media file consumption by the second user device, even if the user controller device did not initiate or otherwise impart/transmit the media files to the second user device (directly or indirectly). Accordingly, multiple user controller devices may participate in controlling media consumption on the second user device.

The illustrated example embodiments will be best understood by reference to the figures. The following description is intended only by way of example, and simply illustrates certain example embodiments.

Figure 2:
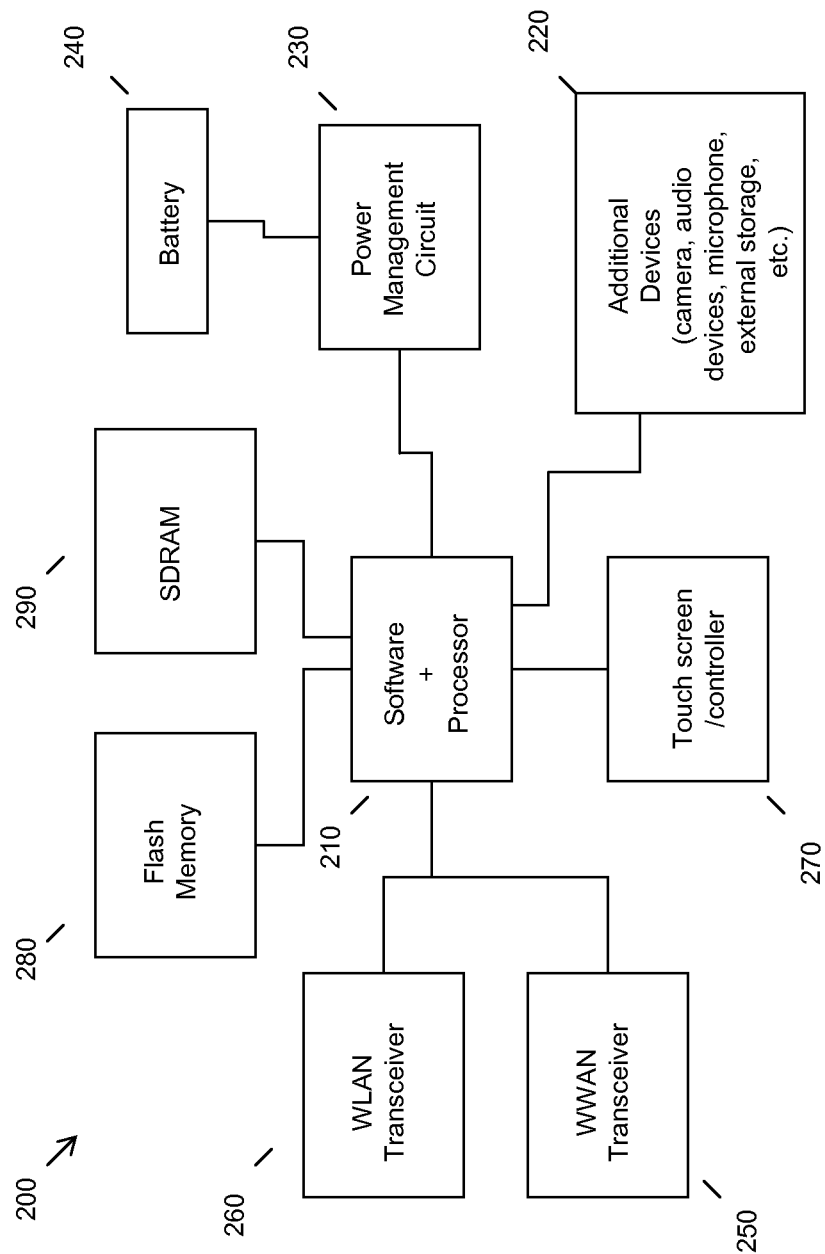
FIG. 2 illustrates another example information handling device and components thereof.

Referring to FIG. 1 and FIG. 2, while various other circuits, circuitry or components may be utilized, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may include user controller devices or other user devices (second user device, third user device, etc.). For example, FIG. 1 may be a potential target or second user device, such as a laptop computing device or a smart television device or the like, that is connectable to one or more user controller devices, for example as illustrated in FIG. 2. Thus, a user may use his or her user controller device 200 to connect to a second (target or destination) device to affect media data consumption control on the second device.

Figure 3:
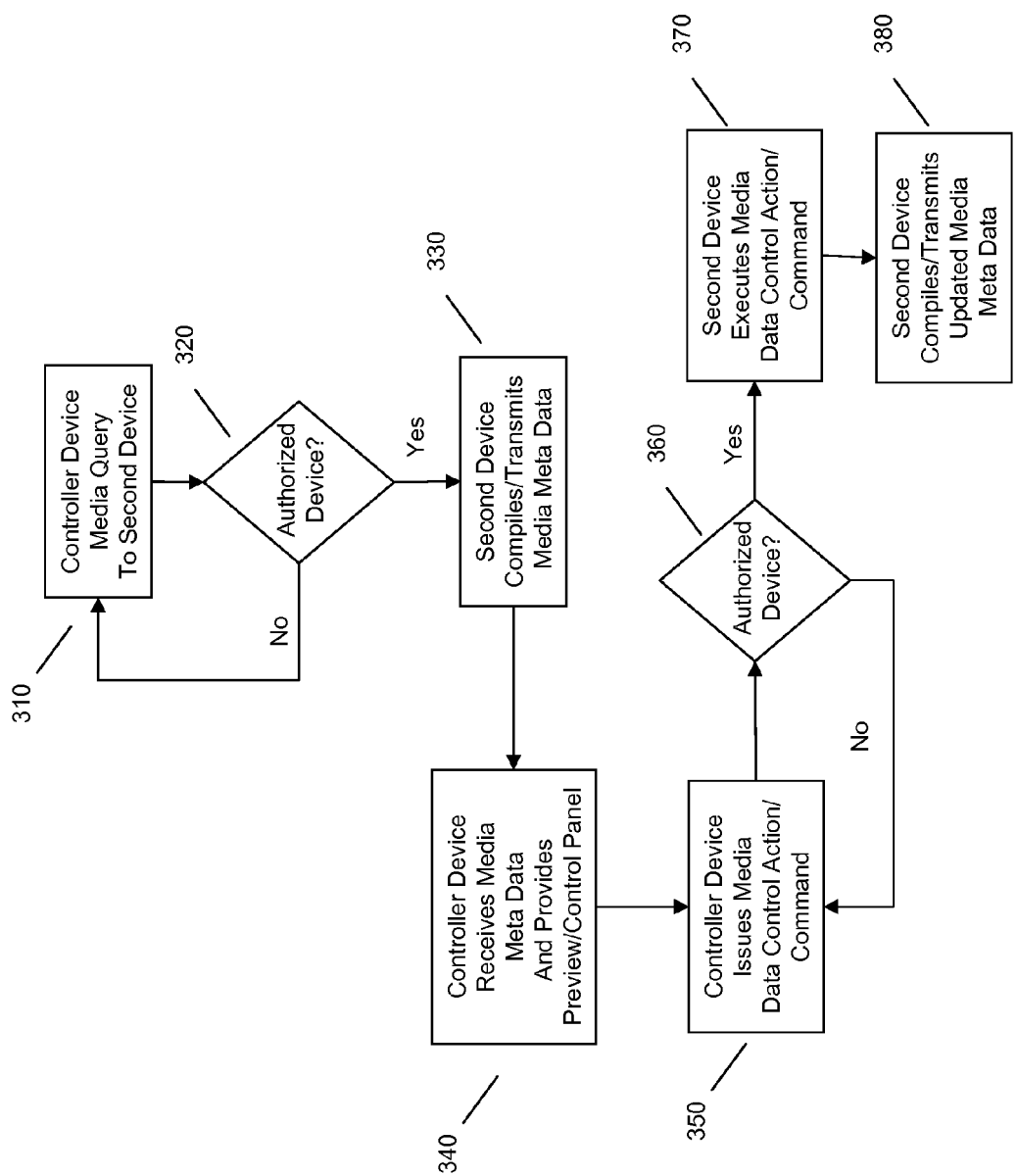
FIG. 3 illustrates an example method of discovery, preview and control of media on a remote device.

Referring to FIG. 3, an example method of discovery, preview and control of media on a remote device is illustrated. At 310 a user controller device interrogates or queries a second user device for media meta data of a media data stream. This query may comprise a request for certain meta data available to the second user device, whether or not it is used by the second user device in media file consumption. For example, the query may comprise a request for information such as play list (ordered list of queued media files), current position in the playlist (i.e., of the currently playing media file, if any), thumbnail image data associated with various media files (e.g., album cover imagery or the like), lyrics (e.g., in the case of audio media files), thumbnail images of the actual media files (e.g., in the case of a slide show media file, video media file, or document media file), and/or control data for controlling (e.g., pausing, playing, selecting for play, queue re-ordering, etc.) the media files using the media player application resident on the second user device. In one embodiment, the media does not include media file data In the process, e.g., in response to receipt of the query, the second user device may ascertain if the controller user device issuing the query is authorized to access the media meta data at 320, as there may be more than one controller user device providing such queries. The authorization process may follow a variety of authorization/security protocols, for example having the second user device compare a controller user device identification to a store of authorized controller user device identification, or may include comparing a user login credential locally. These and/or other identification/credential comparisons may be utilized by a remote authentication device, for example as connected to the second user device.

If the controller user device issuing the query is not authorized, the query may be denied; otherwise, the second user device may compile and transmit the media meta data requested by the controller user device at 330. The second user device may transmit at 330 the media meta data to the controller user device directly, e.g., using a short range wireless communication connection. The controller user device is thus in receipt of information regarding the media file currently being played on the second user device and/or the queued media data files to be played on the second user device.

The controller user device having obtained the media meta data from the second user device at 340 may provide a visual display to the user, for example on a touch screen of a controller user device (e.g., a tablet computer touch screen). The visual display may include a visual indication of the media file currently playing on the second user device and/or a preview of the one or more queued media files to be played on the second user device.

For example, the visual indication of the media file currently playing on the second user device may comprise a thumbnail image of the currently playing media file. The thumbnail image may comprise image data such as an album cover imagery included in the media meta data obtained at 340, a thumbnail image of the actual media file included with the media meta data obtained at 340, other data (e.g., current position within the media file), and/or other summary data regarding the currently playing media file.

The preview of the one or more queued media files to be played may take a variety of forms. The preview may for example take the form of an ordered playlist of the currently queued media files at the second device. The preview of the queued media files may likewise include thumbnail imagery and/or other summary data, for example running time, length or file size and/or type of media file, and/or other summary data regarding the one or more queued media data files at the second device.

Additionally, the visual display, as for example displayed on a touch screen of a controller user device, may further include a media file control action interface. For example, the visual display may include one or more areas for issuing control actions to affect the media file currently playing at the second device and/or the one or more queued media files to be played at the second user device.

As an example, the media file control action interface may allow a user to provide input thereto at the controller user device to pause, stop, fast forward, rewind, skip through, resume and/or play the currently playing media file at the second device. Additionally, the media file control action interface may allow the user to provide input thereto at the controller user device to modify the one or more queued media files to be played at the second user device. For example, the media file control action interface may allow a user to provide input thereto at the controller user device to stop a currently playing media file at the second device and provide a command instruction to play another media file, for example selected from the queued media files to be played at the second user device. Furthermore, a user may modify the queued media files by adding to or taking away from the queued media files. Thus, a user may add one or more media files to the queue or take one or more media files away from the queue. Additionally, a user may provide input to the media file control action interface to re-order an ordered play queue.

Accordingly, responsive to input at the controller user device, at 350 the controller user device issues a media data control action to the second user device for controlling the action of the second user device. The controller user device may issue the media data control action at 350 directly to the second user device, e.g., using a short range wireless communication connection. The second user device may again ascertain if the controller user device issuing the media data control action command is authorized to do so, for example using a similar mechanism as that described with authorizing a controller user device to obtain media meta data at 320.

If the controller user device is not authorized at 360, the media data control action command may be denied or ignored; otherwise, at 370, the second device executes the media data control action command as issued by the controller user device. The second user device may thereafter compile and transmit updated media meta data to one or more controller user device(s) at 380, for example previously associated controller user devices, to apprise the controller user device(s) of the updated status of the second device.

Accordingly, an embodiment permits users to discover, preview and control media consumption on another user device. The various embodiments may discover the media of a second device via query or interrogation of the media meta data available to the second device. Using this discovered media meta data, an embodiment may provide a preview of the media of the second device, such as a visual display of currently playing media and/or queued media at the second device. Embodiments provide control of the media consumption on the second device by flexibly allowing one or more controller user devices to issue commands and receive updated media status of the second device. Thus, multiple users may use their various devices to interrogate other user devices for media meta data, and if authorized, preview and/or control media consumption on such connected user devices.

While the various example embodiments have been described in connection with facilitating particular media data discovery, preview and control actions between various user devices, these were provided as non-limiting examples. Accordingly, embodiments may be used to provide similar functionality and services in other contexts and for many data types. In this regard, "media data", "media file" and the like are used herein so as to be construed broadly to include not only visual media data and file types (such as images and videos), but other data, including music and/or audio data, word processing data, web based content, and the like. "Media meta data" likewise is to be construed broadly to include media file attribute data, imagery data, media control protocol data, media queue data, and the like. Similarly, although devices such as tablets, smart phones, laptops and television devices have been used in the description as specific examples, embodiments may be utilized in connection with other types of devices, for example, e-readers, desktop computers, kiosks, and the like.

It will also be understood that the various embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof.

As will be appreciated by one skilled in the art, various aspects may be embodied as a system, method or computer program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device/computer readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   sending a media query from a controller user device to a second user device;
   receiving media meta data at the controller user device in response to the media query to the second user device, the received media meta data comprising media meta data associated with a media file currently playing on the second user device and media meta data associated with one or more queued media files to be played on the second user device, wherein the controller user device does not transmit the media file to the second user device;
   providing at the controller user device a visual display based on the received media meta data, the visual display comprising a visual indication of the media file currently playing on the second user device and a preview of the one or more queued media files to be played on the second user device; and
   issuing one or more control action commands from the controller user device to the second user device to play one of the one or more queued media files.

2. The method of claim 1, wherein the visual display further comprises a media file control action interface.

3. The method of claim 2, further comprising using the media file control action interface to issue one or more control commands from the controller user device to the second user device.

4. The method of claim 3, wherein the one or more control commands issued from the controller user device comprises a control command affecting the media file currently playing on the second user device.

5. The method of claim 3, wherein the one or more control commands issued from the controller device comprises a control command providing one or more queued media files to be played on the second user device.

6. The method of claim 1, wherein the visual indication of the media file currently playing on the second user device comprises a thumbnail image.

7. The method of claim 1, wherein the preview of the one or more queued media files to be played on the second user device comprises a preview of one or more queued media files derived from a third user device.

8. The method of claim 1, wherein the media meta data does not include media file data.

9. The method of claim 1, wherein the media file currently playing on the second user device comprises a video file, and further wherein the one or more queued media files to be played on the second user device comprise one or more video files.

10. The method of claim 1, wherein the controller device comprises a tablet computing device.

11. An information handling device, comprising:
    one or more processors; and
    a memory operatively coupled to with the one or more processors that stores instructions executable by the one or more processors to perform acts comprising:
    sending a media query from the information handling device to a second user device;
    receiving media meta data at the information handling device in response to the media query to the second user device, the received media meta data comprising media meta data associated with a media file currently playing on the second user device and media meta data associated with one or more queued media files to be played on the second user device, wherein the information handling device does not transmit the media file to the second user device;
    providing a visual display based on the received media meta data, the visual display comprising a visual indication of the media file currently playing on the second user device and a preview of the one or more queued media files to be played on the second user device; and
    issuing one or more control action commands to the second user device to play one of the one or more queued media files.

12. The information handling device of claim 11, wherein the media meta data does not include media file data.

13. The information handling device of claim 12, further comprising using a media file control action interface to issue one or more control commands to the second user device.

14. The information handling device of claim 13, wherein the one or more control commands comprises a control command affecting the media file currently playing on the second user device.

15. The information handling device of claim 13, wherein the one or more control commands issued from the information handling device comprises a control command providing one or more queued media files to be played on the second user device.

16. The information handling device of claim 11, wherein the visual indication of the media file currently playing on the second user device comprises a thumbnail image.

17. The information handling device of claim 11, wherein the preview of the one or more queued media files to be played on the second user device comprises a preview of one or more queued media files derived from a third user device.

18. The information handling device of claim 11, wherein the media file currently playing on the second user device comprises a video file, and further wherein the one or more queued media files to be played on the second user device comprise one or more video files.

19. The information handling device of claim 11, wherein the information handling device is a tablet computing device having a touch screen display.

20. A program product, comprising:
a non-signal storage device having computer program code embodied therewith, the computer program code comprising:
computer program code that sends a media query from a controller user device to a second user device;
computer program code that receives media meta data at the controller user device in response to the media query to the second user device, the received media meta data comprising media meta data associated with a media file currently playing on the second user device and media meta data associated with one or more queued media files to be played on the second user device, wherein the controller user device does not transmit the media file to the second user device;
computer program code that provides at the controller user device a visual display based on the received media meta data, the visual display comprising a visual indication of the media file currently playing on the second user device and a preview of the one or more queued media files to be played on the second user device; and
computer program code that issues one or more control action commands from the controller user device to the second user device to play one of the one or more queued media files.

\* \* \* \* \*